(12) United States Patent
Banerjee et al.

(10) Patent No.: US 10,797,953 B2
(45) Date of Patent: Oct. 6, 2020

(54) SERVER CONSOLIDATION SYSTEM

(75) Inventors: Pradipta K Banerjee, Bangalore (IN); Swarna L Mylavarapu, Bangalore (IN); Vijay Sukthankar, Bangalore (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 940 days.

(21) Appl. No.: 12/910,582

(22) Filed: Oct. 22, 2010

(65) Prior Publication Data

US 2012/0101968 A1  Apr. 26, 2012

(51) Int. Cl.
*H04L 12/24* (2006.01)

(52) U.S. Cl.
CPC ...... *H04L 41/0893* (2013.01); *H04L 41/0823* (2013.01)

(58) Field of Classification Search
CPC .................. H04L 41/0893; H04L 41/0823
USPC .......................................................... 706/21
See application file for complete search history.

(56) References Cited

U.S. PATENT DOCUMENTS

| | | | | |
|---|---|---|---|---|
| 6,516,350 B1* | 2/2003 | Lumelsky | ............... | H04L 29/06 709/224 |
| 6,850,530 B1* | 2/2005 | Waclawsky | ............. | H04L 45/00 370/401 |
| 6,944,662 B2* | 9/2005 | Devine | ............... | G06F 17/3089 707/E17.116 |
| 6,996,374 B1* | 2/2006 | Bao | ....................... | H04W 24/02 455/423 |

(Continued)

FOREIGN PATENT DOCUMENTS

| | | |
|---|---|---|
| CN | 101232511 A | 7/2008 |
| CN | 101753444 A | 6/2010 |

(Continued)

OTHER PUBLICATIONS

Bob Wallace et al., "Taking Control: Load-balancing software gives network managers ability to regulate traffic", Computerworld, 1996. (Year: 1996).*

(Continued)

*Primary Examiner* — Alexey Shmatov
*Assistant Examiner* — Beatriz Ramirez Bravo
(74) *Attorney, Agent, or Firm* — Kunzler Bean & Adamson; Bruce R. Needham

(57) ABSTRACT

A computer program product for a network management device, including: a computer readable storage medium to store a computer readable program, wherein the computer readable program, when executed on a computer, causes the computer to perform operations for server management in a computer network. The operations include: receiving resource usage data generated at a network communication device coupled between a server and a network management device, wherein the resource usage data describes resource usage of the server; and classifying the server into a cluster of servers based on the resource usage data from the network communication device and a cluster characterization for the cluster. The cluster includes a plurality of servers with similar resource usage data, and the cluster is one of a plurality of clusters managed by the network management device.

19 Claims, 6 Drawing Sheets

(56) References Cited

U.S. PATENT DOCUMENTS

| | | | |
|---|---|---|---|
| 7,143,392 B2* | 11/2006 | Ii | G06F 11/323 714/E11.181 |
| 7,190,478 B2* | 3/2007 | Caffary, Jr. | G06Q 30/06 358/1.13 |
| 7,328,261 B2* | 2/2008 | Husain | H04L 41/0853 709/224 |
| 7,693,983 B1* | 4/2010 | Gupta | H04L 12/1471 709/221 |
| 7,693,991 B2 | 4/2010 | Greenlee et al. | |
| 7,702,779 B1* | 4/2010 | Gupta | G06F 9/50 709/220 |
| 7,716,335 B2* | 5/2010 | Dinker | G06F 11/3409 709/203 |
| 7,739,331 B2* | 6/2010 | Gu | G06F 17/30985 709/203 |
| 7,761,876 B2 | 7/2010 | Oliveira | |
| 7,904,910 B2* | 3/2011 | Romero | G06F 9/4806 709/224 |
| 8,046,767 B2* | 10/2011 | Rolia | G06Q 10/06 709/223 |
| 8,112,546 B2* | 2/2012 | Razmov | H04L 67/22 709/223 |
| 8,171,133 B2* | 5/2012 | Tanaka | G06F 11/3409 709/224 |
| 2001/0052013 A1* | 12/2001 | Munguia | G06F 11/0709 709/225 |
| 2002/0198961 A1* | 12/2002 | Krishnamurthy | G06F 17/30899 709/217 |
| 2003/0046343 A1* | 3/2003 | Krishnamurthy | G06F 17/30899 709/203 |
| 2003/0056200 A1* | 3/2003 | Li | G06F 11/323 717/128 |
| 2003/0126260 A1* | 7/2003 | Husain | H04L 41/0853 709/225 |
| 2004/0093406 A1* | 5/2004 | Thomas | H04L 67/1008 709/224 |
| 2004/0117226 A1* | 6/2004 | Laiho | G06Q 10/06393 705/7.39 |
| 2005/0005012 A1* | 1/2005 | Odhner | G06Q 10/06 709/226 |
| 2005/0102676 A1* | 5/2005 | Forrester | G06F 9/505 718/105 |
| 2005/0188075 A1* | 8/2005 | Dias | H04L 67/1008 709/224 |
| 2005/0193113 A1* | 9/2005 | Kokusho | G06F 9/5083 709/225 |
| 2005/0223089 A1* | 10/2005 | Rhodes | H04L 43/0876 709/223 |
| 2006/0136701 A1 | 6/2006 | Dickinson | |
| 2007/0011260 A1* | 1/2007 | Chiu | H04L 29/06027 709/207 |
| 2007/0083513 A1* | 4/2007 | Cohen | G06F 11/008 |
| 2008/0222646 A1* | 9/2008 | Sigal | G06F 9/505 718/105 |
| 2009/0031066 A1* | 1/2009 | Bansal | G06F 9/5011 710/113 |
| 2009/0168661 A1* | 7/2009 | Lingafelt | H04L 41/5009 370/252 |
| 2009/0199196 A1* | 8/2009 | Peracha | G06F 11/3409 718/104 |
| 2009/0287720 A1* | 11/2009 | Herter | G06F 11/3006 |
| 2009/0287887 A1* | 11/2009 | Matsuki | G06F 3/0607 711/154 |
| 2010/0015926 A1* | 1/2010 | Luff | H04L 41/0604 455/67.13 |
| 2010/0083248 A1 | 4/2010 | Wood et al. | |
| 2010/0145629 A1* | 6/2010 | Botich | G06Q 10/00 702/23 |
| 2010/0162036 A1* | 6/2010 | Linden | G06F 11/181 714/4.11 |
| 2010/0162383 A1* | 6/2010 | Linden | G06F 11/181 726/13 |
| 2010/0169446 A1* | 7/2010 | Linden | G06F 11/181 709/206 |
| 2010/0190469 A1* | 7/2010 | Vanderveen | H04L 12/14 455/406 |
| 2010/0299433 A1* | 11/2010 | De Boer | H04L 47/14 709/224 |
| 2010/0325261 A1* | 12/2010 | Radhakrishnan | G06F 15/173 709/224 |
| 2011/0038467 A1* | 2/2011 | Jin | H04M 3/36 379/88.17 |
| 2011/0191477 A1* | 8/2011 | Zhang | G06F 15/173 709/226 |
| 2011/0219118 A1* | 9/2011 | Cowan | G06F 11/3409 709/224 |
| 2012/0101968 A1* | 4/2012 | Banerjee | H04L 41/0823 706/21 |
| 2012/0102503 A1* | 4/2012 | Meijer | G06F 9/5094 719/318 |

FOREIGN PATENT DOCUMENTS

| | | | | |
|---|---|---|---|---|
| CN | 101764703 A | 6/2010 | | |
| CN | 101859317 A | 10/2010 | | |
| WO | 2009019671 A1 | 2/2009 | | |
| WO | WO2009019671 | * | 2/2009 | H04L 12/56 |
| WO | WO 2009019671 A1 | * | 2/2009 | H04L 47/14 |

OTHER PUBLICATIONS

Pradeep et al. "Performance Evaluation of Virtualization Technologies for Server Consolidation" Hewlett-Packard Development Company, (2007), 15 pages.

Smith "Server Consolidation through Virtualization with Quad-Core Intel® Xeon® Processors" Intel Corporation and Infosys Technologies, (Jan. 2008), 30 pages.

"Virtualizing Server Workloads: Looking Beyond Current Assumptions" Advanced Micro Devices, (Dec. 2009), 14 pages.

* cited by examiner

SERVER CONSOLIDATION SYSTEM

BACKGROUND

In network management systems, sometimes it is beneficial to analyze resource usage for the servers in determining how to improve or maximize usage of the server and network resources. Server consolidation is one approach to improving or maximizing resource usage, particularly when the network has an excessive number of servers such that some servers are being under-utilized. Server consolidation may include implementing multiple virtual machines on servers to make more effective use of each machine.

Server consolidation analyses generally use Computer Processing Unit (CPU), memory, and network usage data as base resource usage data from a present scenario to arrive at a target scenario (a consolidated environment). In some conventional methods, agents or resource measurement applications are deployed at network end-points (virtual or dedicated servers) to capture the resource usage data. Other server consolidation methods may use a master server to collect the usage data at regular intervals by using remote network protocols like Secure Shell (SSH) or Telnet.

These methods of data collection are very intrusive, require change management requests for servers, and result in security exposures for the duration of data collection, and consequently can make network users uncomfortable with either of these approaches. However, due to the lack of alternate methods, network users are forced to use the conventional methods.

SUMMARY

Embodiments of a computer program product are described. In one embodiment, the computer program product is a computer program product for a network management device, including: a computer readable storage medium to store a computer readable program, wherein the computer readable program, when executed on a computer, causes the computer to perform operations for server management in a computer network. The operations include: receiving resource usage data generated at a network communication device coupled between a server and a network management device, wherein the resource usage data describes resource usage of the server; and classifying the server into a cluster of servers based on the resource usage data from the network communication device and a cluster characterization for the cluster. The cluster includes a plurality of servers with similar resource usage data, and the cluster is one of a plurality of clusters managed by the network management device. Other embodiments of the computer program product are also described.

Embodiments of a method are also described. In one embodiment, the method is a method for server consolidation in a computer network, including: receiving resource usage data generated at a network communication device coupled between a server and a network management device, wherein the resource usage data describes resource usage of the server; and classifying the server into a cluster of servers based on the resource usage data from the network communication device and a cluster characterization for the cluster. The cluster includes a plurality of servers with similar resource usage data, and the cluster is one of a plurality of clusters managed by the network management device. Other embodiments of the method are also described.

Embodiments of a device are also described. In one embodiment, the device is a network management device, includes a processing device configured to: receiving resource usage data generated at a network communication device coupled between a server and a network management device, wherein the resource usage data describes resource usage of the server; and classifying the server into a cluster of servers based on the resource usage data from the network communication device and a cluster characterization for the cluster. The cluster includes a plurality of servers with similar resource usage data, and the cluster is one of a plurality of clusters managed by the network management device. Other embodiments of the network management device are also described. Embodiments of a network management system are also described.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

Throughout the description, similar reference numbers may be used to identify similar elements.

DETAILED DESCRIPTION

Figure 1:
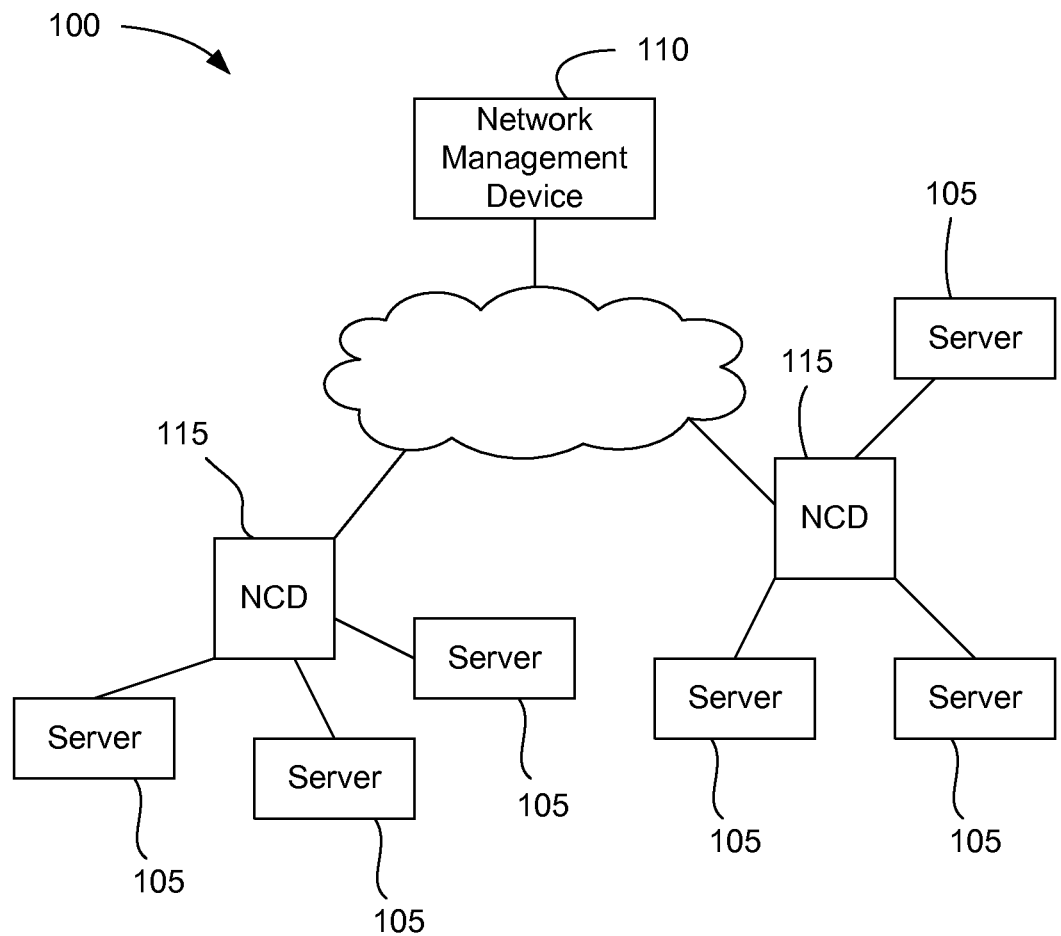
FIG. 1 depicts a schematic diagram of one embodiment of a computer network.

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

While many embodiments are described herein, at least some of the described embodiments present a method for server management in a computer network, including server consolidation. Embodiments of the method as described herein cluster servers in the network together based on resource usage data. More specifically, the method uses resource usage data from servers in the network to create clusters of servers having similar resource usage data, and any new servers added to the network are added to a cluster based on a subset of the base resource usage data for the new servers. The subset of resource usage data may be collected from network devices rather than from the new servers, and may be used to predict the rest of the resource usage data for the new servers based on the subset of resource usage data. Conventional server consolidation methods gather any resource usage data from the servers themselves, which may be very intrusive and subject the servers to security openings and possible performance degradation.

As used herein and in the appended claims, the term "network communication device" is broadly defined to include any device that enables servers on a computer network to communicate with other devices on the network, including other servers, a central network management device, or others. Network communication devices may include wired or wireless routers, hubs, switches, and others. A network communication device may be housed in a network management device that allows the network management device to communicate directly with servers and/or collect resource usage data from the servers.

FIG. 1 depicts a schematic diagram of one embodiment of a computer network 100. A computer network 100 typically includes one or more servers 105 that may be connected to a network management device 110 through network communication devices 115. Computer networks 100 are classified depending on the network's distribution scale, scope, and purpose. Network classifications include Local Area Network (LAN), Wide Area Network (WAN), Virtual Private Network (VPN), and others. Access rights and other configurations may differ between networks. Additionally, the different networks may require different hardware/software to operate.

In one embodiment, the network includes multiple network communication devices 115 connected directly to the network management device 110, each network communication device 115 connected to multiple servers 105. In some embodiments, the computer network 100 includes several layers of devices between the network management device 110 and the servers 105. Other network embodiments may include a network management device 110 that has internal network communication devices 115 such that the network management device 110 is directly connected to each of the servers 105.

Networks having multiple servers 105 may distribute a workload over some or all of the servers, such that each server 105 is assigned specific tasks contributing to the operation of the network. Each request or task sent to a server 105 causes the utilization of processor, network, and memory resources. Ideally, the network is configured to maximize the available resources for each server. In practice, however, not all of the resources for every server 105 in a network is fully utilized at all times, nor is the workload distribution among servers 105 exactly even. Additionally, servers 105 may have different capacities of resources, which may affect the workload distribution.

Server consolidation on a network may help maximize resource usage for each of the servers 105 in a network by moving the workload to different servers, to fewer servers, and/or to virtual servers on fewer physical servers 105. Virtual servers are able to execute instructions and process a portion of the network workload separately from other virtual servers on a single machine while sharing the server/network resources with the other virtual servers. Virtual servers may be useful on servers 105 that would otherwise be under-utilized. In some embodiments, servers 105 are only given a portion of the workload that must be run separately from other processes so as to avoid interference between the processes. By installing virtual servers on a single machine that each run on separate operating systems, the physical server 105 is able to run processes on each of the virtual servers without causing interference between the processes, which improves the physical server's resource usage. Server consolidation may also be useful when transferring workload from old servers 105 to new servers, for example when the old servers 105 are no longer capable of performing the workload.

Figure 2:
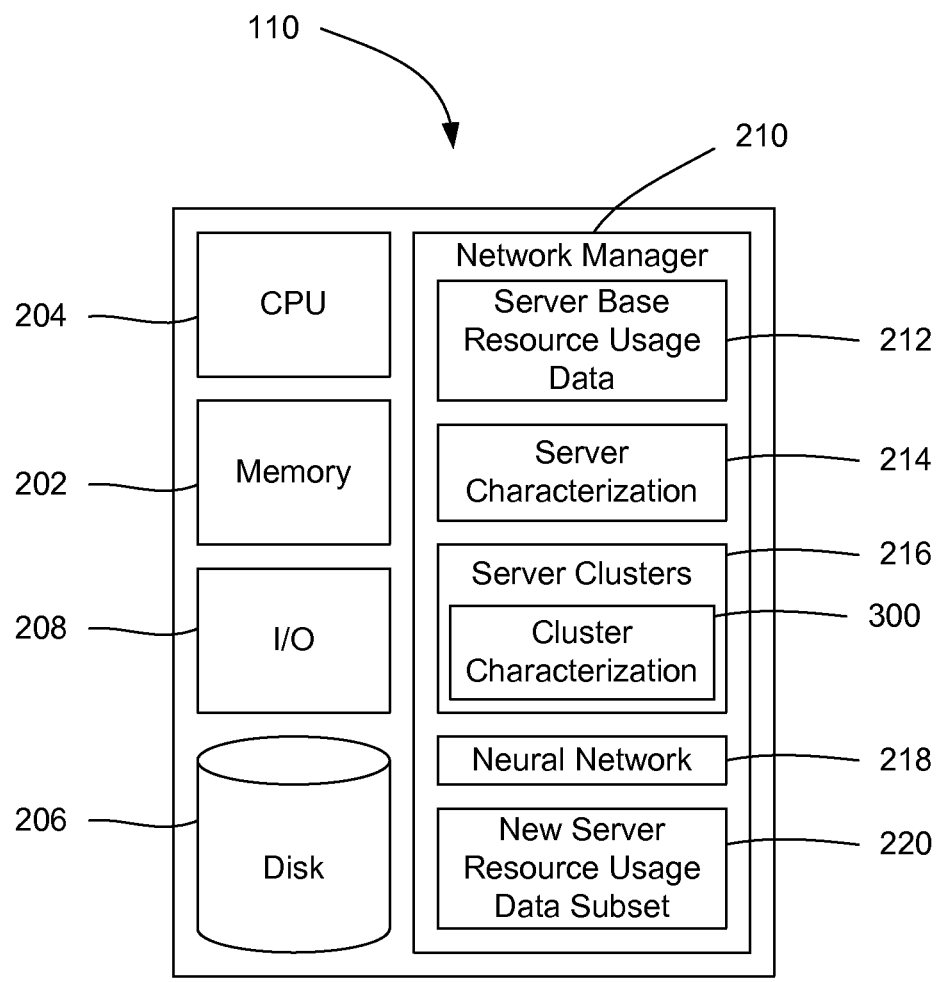
FIG. 2 depicts a schematic diagram of one embodiment of the network management device of FIG. 1.

FIG. 2 depicts a schematic diagram of one embodiment of the network management device 110 of FIG. 1. The depicted network management device 110 includes various components, described in more detail below, that are capable of performing the functions and operations described herein. In one embodiment, at least some of the components of the network management device 110 are implemented on a computer system. For example, the functionality of one or more components of the network management device 110 may be implemented by computer program instructions stored on a computer memory device 202 and executed by a processing device 204 such as a central processing unit (CPU). The network management device 110 may include other components, such as a disk storage drive 206 or other computer readable storage medium, input/output devices 208, and a network manager 210. The network manager 210 may include or communicate with one or more network communication devices 115 that allow the network manager 210 to manage the network resources, workload distribution, and also to predict server 105 resource usage and perform the server management method described herein. The network manager 210 may perform functions for the server management method described herein, and may maintain and store data used by the method.

While managing the network, the network manager 210 may use data collected about servers 105 connected to the network. In one embodiment, as part of a server consolidation process, the network manager 210 collects resource usage data 212 for each of the servers 105. The resource usage data 212 may include CPU usage, memory usage, and network usage for all of the servers 105. The CPU and memory usage data for each of the servers 105 is produced by the servers 105. Such data may be obtained by conventional means, such as through resource measurement applications on each of the servers 105 or through network protocols such as Secure Shell (SSH). Network usage data for each of the servers 105 may be produced either by the servers 105 themselves or by network devices configured to measure the network usage for each individual server 105. The resource usage data 212 may include data points from several time periods for the use each resource for each server 105.

After the resource usage data 212 is received by the network manager 210, the network manager 210 obtains a statistical characterization 214 for the resource usage data 212. In one embodiment, the statistical characterization 214 includes statistical measures such as mean, variance, standard deviation, and percentile measurements for each type of data. Other embodiments may include additional statistical measures for determining central tendencies and dispersion of the data, such as mean, median, mode, variance and standard deviation, percentiles, and/or measures that help characterize the usage.

The network manager 210 then groups the servers 105 into clusters 216 based on the calculated statistical characterizations 214. A cluster 216 contains servers 105 that have similar resource usage characterizations as determined by the number of servers 105 in the network and the clusters 216 set up by the network manager 210. In one embodiment, the number of clusters 216 is determined by the network manager 210 according to the number of servers 105 connected to the network, the amount of resources available, and the current total resource usage. In other embodiments, the number of clusters 216 may be determined arbitrarily or according to a network user or network specialist. The number of clusters 216 may have an upper bound or no upper limit, according to the implementation of the server management method.

Figure 5:
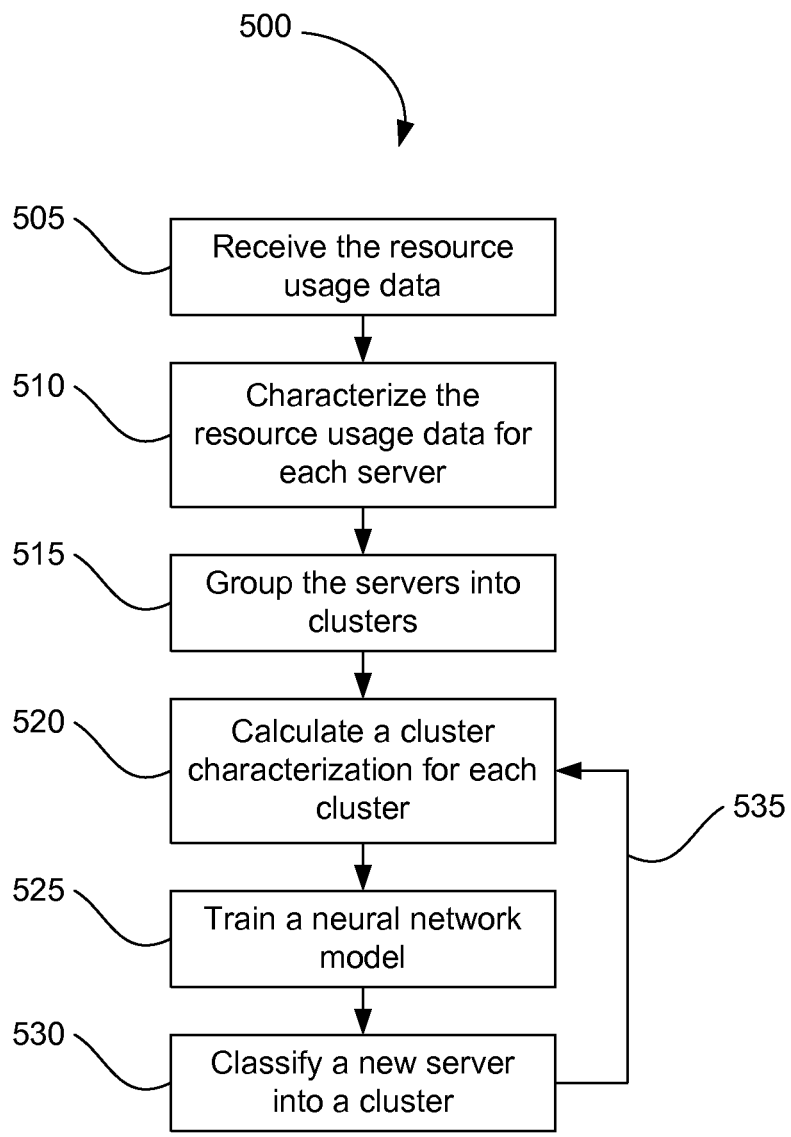
FIG. 5 depicts a flow diagram of one embodiment of a method for server management in a computer network.

When a new server 400, shown in FIG. 5, is added to the network, the network manager 210 is able to classify the new server 400 in one of the previously created clusters 216 based on a subset 220 of resource usage data for the new server 400. A neural network model 218 may be trained to identify the clusters 216 and use the data for the new server 400 to correctly classify the new server 400 into a cluster 216. In one embodiment, the resource usage data subset 220 includes network usage data produced by a network communication device 115. Because the network usage data is produced by a device external to the new server 400, there is no need for end-point applications or intrusive networking protocol commands executed on the new server 400 by the network management device 110. The CPU and memory usage data for the new server 400 is predicted based on the network usage data, and the new server 400 is classified into a cluster 216 with other servers 105 that share similar resource usage characteristics. A cluster characterization 300 is determined by the characterizations of each server 105 within the cluster 216, and the cluster characterization 300 may be used to determine whether a new server 400 should be added to that cluster 216 or to another. In other embodiments, the resource usage data 212 and subset 220 of resource usage data may include other resource usage data or other combinations of those listed herein. In some embodiments, the network manager 210 may be able to predict the storage usage data for a particular server 105 based on other resource usage data.

In one embodiment, after the new server 400 has been added to the network and classified into a cluster 216, the network manager 210 updates the cluster characterization 300 for that cluster with the server characterization 214 of the new server 400. A subsequent new server 400 will be grouped into a cluster 216 based on the updated cluster characteristics 300. Consequently, the updated cluster characteristics 300 may affect where a new server 400 is grouped.

Figure 3A:
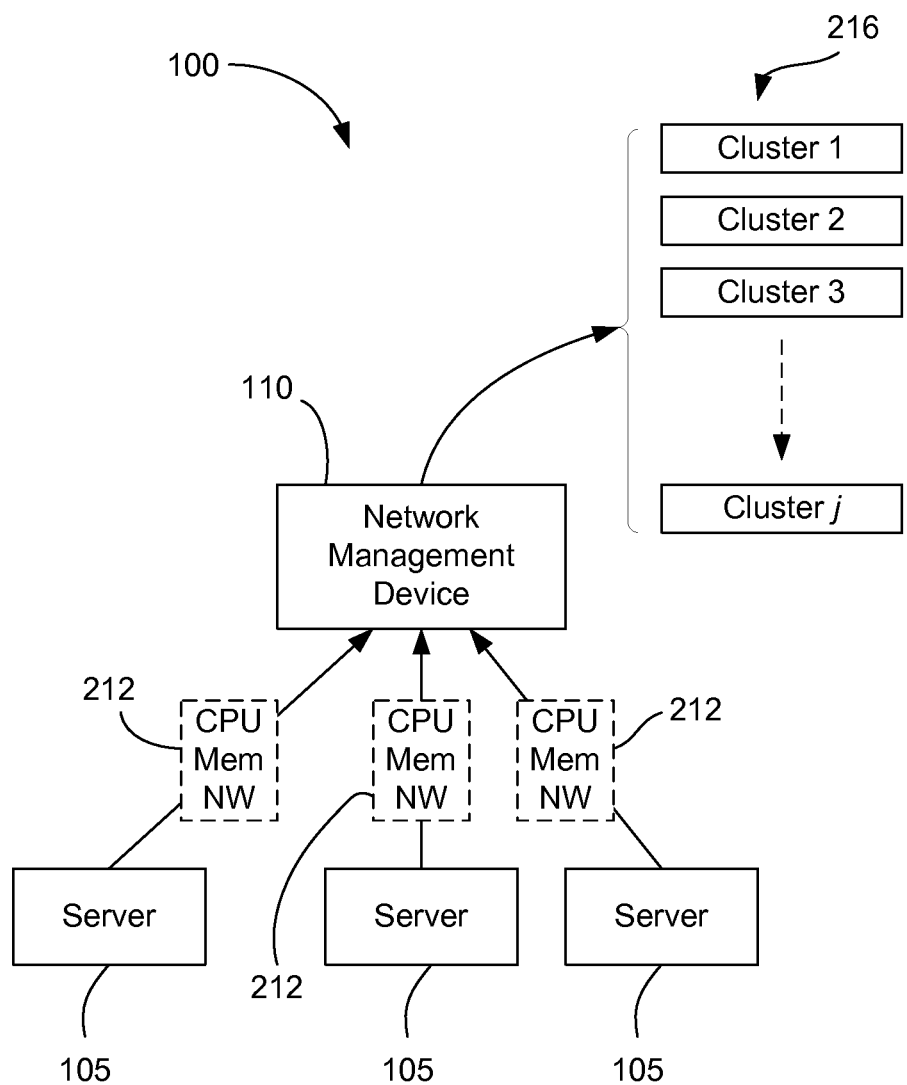
FIG. 3A depicts a schematic diagram of one embodiment of a network management device grouping servers into clusters.
Figure 3B:
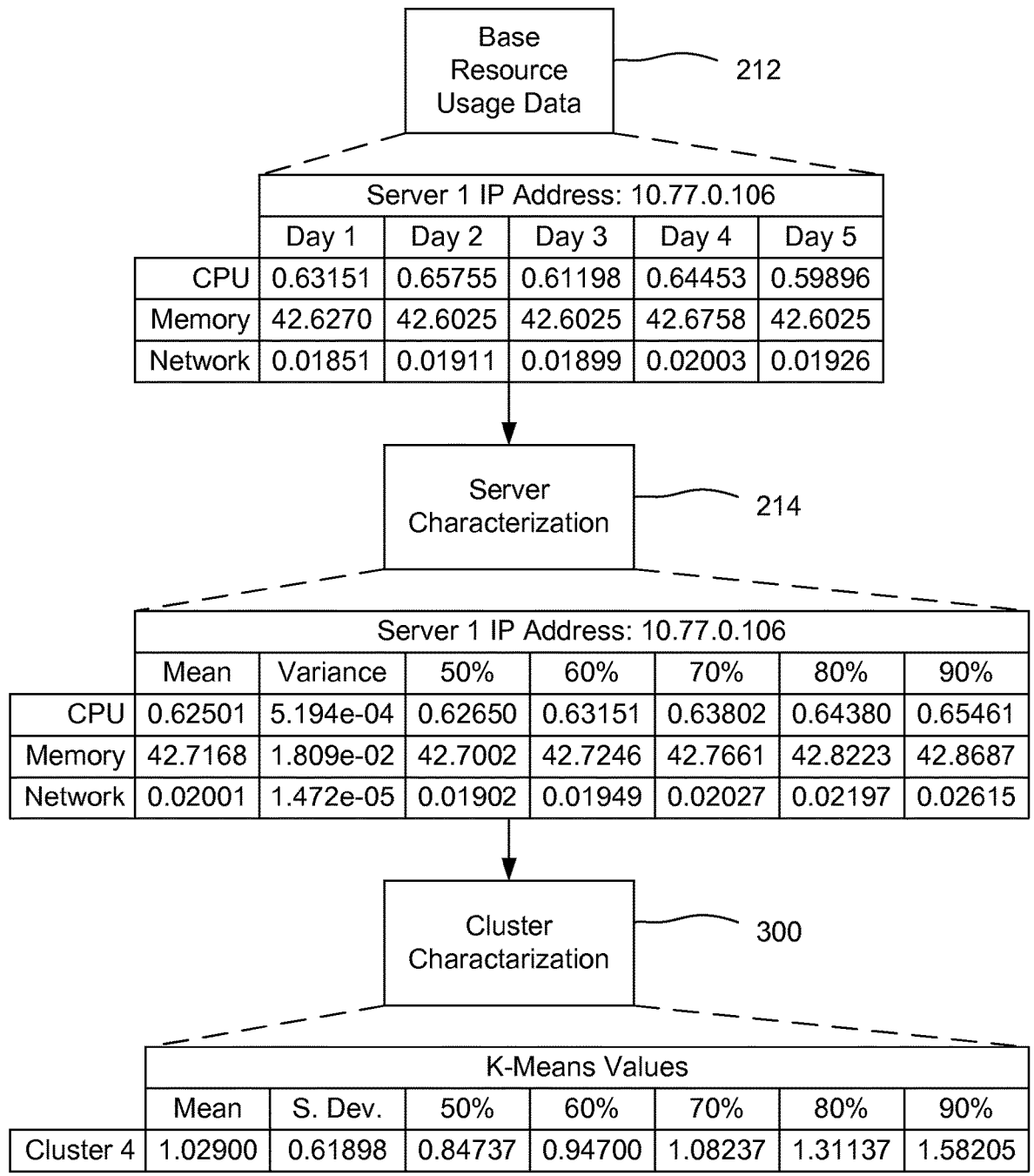
FIG. 3B depicts a flow diagram of one embodiment of a method of grouping servers into clusters based on server resource usage data.

FIG. 3A depicts a schematic diagram of one embodiment of a network management device 110 grouping servers 105 into clusters 216. FIG. 3B depicts a flow diagram of one embodiment of a method of grouping servers 105 into clusters based on server 105 resource usage data for FIG. 3A. The network management device 110 is in communication with several servers 105 in a network. The network management device 110 may be in direct communication with the servers 105 or may be in communication with the servers 105 through one or more network communication devices 115. The network management device 110 begins the consolidation process by collecting resource usage data 212. The resource usage data 212 includes CPU usage, memory usage, and network usage for each of the servers 105.

The resource usage data 212 shown in FIG. 3B depicts data for a first server. The data is collected for a server 105 connected to the network management device 110. The data includes CPU usage, memory usage, and network usage for the server 105 at several different points in time. The network management device 110 may identify each server 105 by its internet protocol (IP) address. The data is produced by the server 105 and may be collected by the network management device 110 using conventional methods.

Once the servers 105 have sent the resource usage data 212 to the network management device 110, the data is processed by the network management device 110 and a statistical server characterization 214 is made for each data type for each server. The server characterization 214 includes several statistical measures, as shown in FIG. 3B. In the embodiment of FIG. 3B, the statistical measures for the resource usage data include mean, variance, $50^{th}$ percentile, $60^{th}$ percentile, $70^{th}$ percentile, $80^{th}$ percentile, and $90^{th}$ percentile. The server characterization 216 is shown for the first server.

After characterizing the resource usage data 212 for all servers 105 presently connected to the network, the network management device 110 groups the servers 105 into clusters based on the server characterizations 214. In one embodiment, the network management device 110 uses a k-means algorithm for grouping the servers 105 into clusters 216. FIG. 3A depicts a group of clusters 216 from Cluster 1 to Cluster j. The network management device 110 may create as few or as many clusters 216 as needed for a particular network. Other embodiments may group the servers 105 into clusters 216 using other clustering techniques. Servers 105 in each cluster have similar resource usage data to the other servers 105 in the same cluster. The server characteristics 214 in each cluster 216 define the cluster characteristics 300 for the cluster 216. The cluster characteristics 300 are what the neural network model 218 uses to determine in which cluster 216 a new server 400 will be classified.

Figure 4:
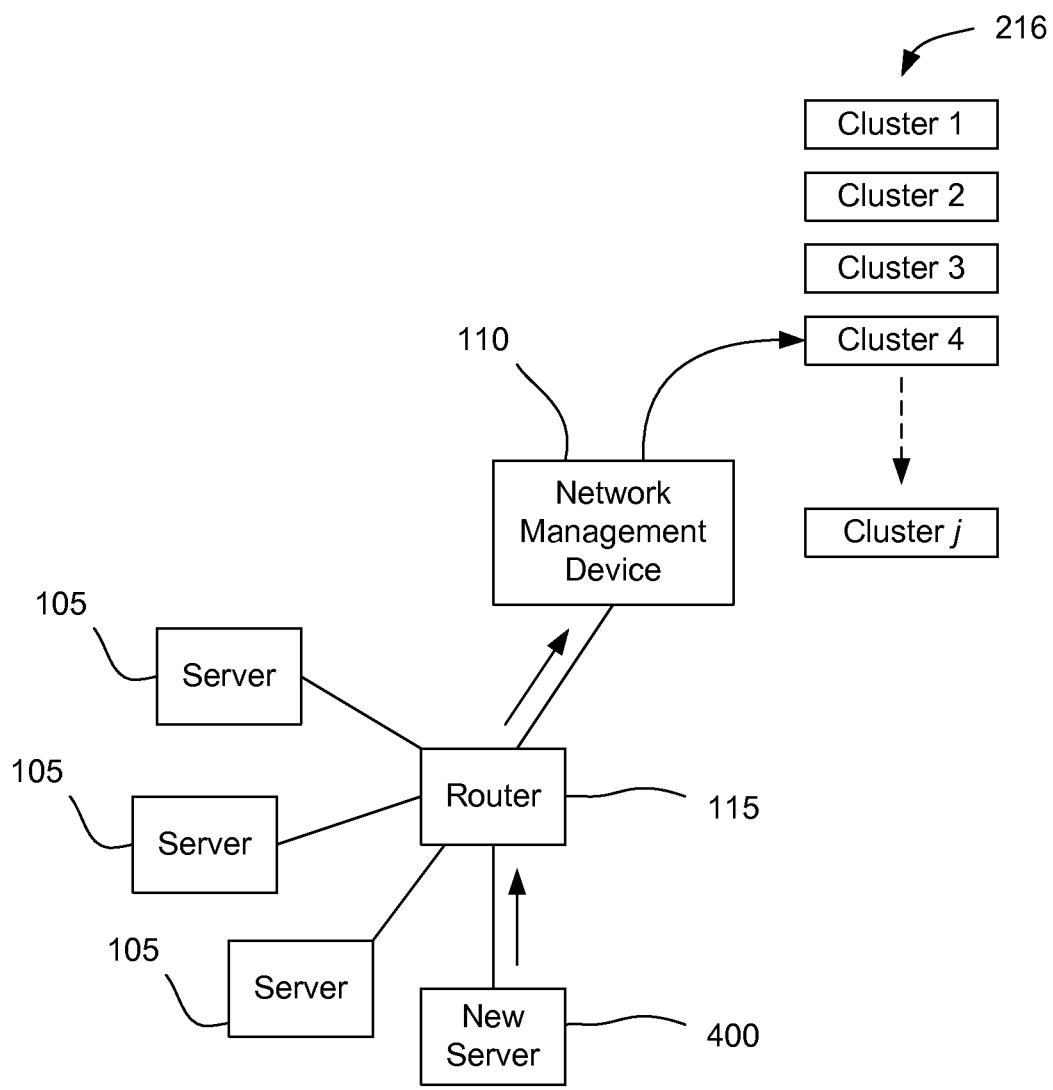
FIG. 4 depicts a schematic diagram of one embodiment of the network management device of FIG. 3 classifying a new server to a cluster.

FIG. 4 depicts a schematic diagram of one embodiment of the network management device 110 of FIG. 3 classifying a new server 400 to a cluster 216. In one embodiment, the clusters 216 communicate with the network management device 110 through a router. The servers 105 connected to the router during the initial stages of the server consolidation process have already been classified into clusters according to the statistical characterizations of their resource usage data. The network may include other routers and/or servers 105.

In one embodiment, when a new server 400 is connected to the router and begins communicating with the network management device 110, the network management device 110 attempts to group the new server 400 into one of the existing clusters 216. In one embodiment, the network management device 110 trains a neural network model 218 to classify new servers 400 to the clusters 216. The neural network model 218 may receive as an input the subset 220 of data for the servers 105 in a single cluster 216 to train the model to identify the correct cluster based on the subset. The model 218 may be trained in such a way for each cluster 216.

After obtaining the resource usage data subset 220 for the new server 400, the network management device 110 is able to predict or estimate the other resource usage data 212 for the new server 400 using the trained model 218. In one embodiment, the network management device 110 obtains the network usage data for the new server 400 from the network communication device 115. The neural network model 218 is trained to correctly identify a particular cluster 216 (in this embodiment, Cluster 4) using the network usage data for the servers 105 already assigned to the cluster 216 as input. Once the neural network model 218 is trained, it may be used to classify new servers 400 to a cluster 216 based on the subset 220 for the new servers 400. New servers 400 may be placed in a cluster 216 that has network usage data most similar to the network usage data of the new server 400. The network management device 110 may then update the cluster characterization 300 for the cluster to which the new server 400 was added and retrain the neural network model 218 using the data from the new server 400.

FIG. 5 depicts a flow diagram of one embodiment of a method 500 for server management in a computer network 100. Although the method 500 is described in conjunction with the network management device 110 of FIG. 1, embodiments of the method 500 may be implemented with other types of network management devices.

In one embodiment, the network management device 110 receives 505 resource usage data 212 for a plurality of servers 105. The servers 105 are in communication with the network management device 110 and may be connected to a network communication device 115. The resource usage data 212 may include processor usage, memory usage, and network usage of each server 105 presently connected to the computer network 100. Other embodiments may include other resource usage data, such as server storage usage. The network management device 110 characterizes 510 the resource usage data for each server.

In one embodiment, the server characterization 214 includes statistical measures of the resource usage data 212 over several data points from different time periods. For example, the resource usage data 212 may include data points for each day in a span of 5 days. Multiple data points allow the statistical measures to give trends and averages for the usage types. In one embodiment, the server characterization 214 includes values representing mean, variance, $50^{th}$ percentile, $60^{th}$ percentile, $70^{th}$ percentile, $80^{th}$ percentile, and $90^{th}$ percentile of the data. In one embodiment, the network management device 110 may calculate fence values upper and lower fence values from the resource usage data. Values that fall above the upper fence value or below the lower fence value may be considered outlier values and discarded. This may help the network management device 110 to create a more accurate characterization 214 of the data for each server 105.

After receiving the resource usage data 212, the network management device 110 groups 515 the servers 105 into clusters 216 based on the server characterization 214 of the resource usage data 212 for each server 105. Servers 105 with similar resource usage data 212 will be grouped together according to a clustering algorithm. The method 500 may use any clustering algorithm, such as a k-means algorithm. The network management device 110 may then calculate 220 a cluster characterization for each cluster 216 using the resource usage data 212 of all the servers 105 within a single cluster 216.

The network management device 110 then classifies 530 the new server 400 into one of the clusters 216 based on a subset 220 of resource usage data 212 for the new server 400 and the cluster characterization 300 for the servers 105 in the cluster. In one embodiment, the subset 220 is network usage data for the new server 400. The network usage data may be obtained by the network management device 110 from a source other than the new server 400, such as the network communication device 115, so as to avoid opening security holes or installing intrusive applications at the new server 400.

In one embodiment, the network management device 110 trains 525 a neural network model 218 to classify new servers 400 into clusters based on similarities between the subset of data for the new server 400 and the same subset of data for the servers 105 already grouped into clusters. Because the subset 220 for the new server 400 is similar to the servers 105 in the cluster into which the new server 400 is classified, the network management device 110 may predict or estimate the other resource usage data for the new server 400. The cluster characterization 300 may include factors other than the subset of data.

When the new server 400 is added to the cluster 216, the network management device 110 may update 535 the cluster characterization 300 for the cluster 216. This may include re-training 525 the neural network model 218 to correctly classify 530 any new servers 400 into clusters 216 with the new server's characterization 214 factored into the cluster characterization 300. This may affect where subsequent new servers 400 are classified.

In one embodiment, the network management system 100 may include all new servers 400. The network management system 100 may use a pre-trained neural network model 218 to classify 530 all of the new servers 400 into newly created clusters 216. The subset 220 of resource usage data for the new servers 400 allow the neural network model 218 to adequately group the new servers 400 into clusters 216 with similar server characteristics 214. Consequently, once a neural network model 218 has been trained 525, there may no longer be a need to install intrusive applications at end-points in the network 100 or to apply other conventional server management methods.

In one embodiment, the method uses a k-means algorithm to produce the server characterization 214. In other embodiments, the method 500 may use other clustering algorithms to measure the similarities between workload patterns in the servers 105. The difference between characteristics of two servers A and B may be mathematically represented by:

$$d_{AB} = \sqrt{\sum_{j \in J} (x_{Aj} - x_{Bj})^2}$$

where j refers to the $j^{th}$ characteristic for the server, J represents the total number of characteristics, and x refers to the value of that characteristic.

In one embodiment using the k-means algorithm, the overall difference between server workloads to their respective clusters 216 may be minimized. The function for the algorithm is based on an $l_2$ norm, and the equation is:

$$\text{Min} \sum_{j=1}^{k} \sum_{x_i \in C_j} \|x_i - c_j\|^2$$

where $x_i$ refers to the measurement of the $i^{th}$ server and $C_j$ refers to the $j^{th}$ cluster with center $c_j$. In one embodiment, the center of a cluster refers to the group level workload pattern based on the same statistical measures.

The k-means algorithm in one embodiment follows the following steps:
1. Create k centers to initialize the algorithm.
2. Randomly assign each of the n servers to a cluster which has the smallest $l_2$ norm.
3. Update the centers of each cluster based on its current servers.
4. For each server I that belongs to the $j^{th}$ cluster, check the distance of the workload characteristics of a server with respect to each cluster center and classify to the cluster that has the closest distance.
5. If a server has not moved on the last n calls in step 4 then stop, else go tog step 3.

Sample resource usage data 212, server characterizations 214, cluster characterizations 300, and clustering vector are now detailed below for a given computer network 100 having multiple servers 105.

Resource Usage Data Sourced at Intervals of One Hour
CPU % Usage:

| Server | Interval 1 | Interval 2 | Interval 3 | Interval 4 | Interval 5 |
|---|---|---|---|---|---|
| 1 | 0.63151033 | 0.65755200 | 0.61197917 | 0.64453117 | 0.59895833 |
| 2 | 0.47740079 | 0.49855398 | 0.50506274 | 0.49367245 | 0.50668981 |
| 3 | 0.49316400 | 0.49316400 | 0.54388460 | 0.51757800 | 0.50618483 |
| ... | | | | | |
| 116 | 33.2339602 | 3.5413619 | 48.8024110 | 2.2005739 | 13.0310174 |

Memory % Usage:

| Server | Interval 1 | Interval 2 | Interval 3 | Interval 4 | Interval 5 |
|---|---|---|---|---|---|
| 1 | 42.62700 | 42.60250 | 42.60250 | 42.67580 | 42.6025 |
| 2 | 9.46452 | 9.46452 | 9.46452 | 9.47266 | 9.78190 |
| 3 | 9.85514 | 9.88770 | 9.87142 | 9.86328 | 9.88770 |
| ... | | | | | |
| 116 | 49.87790 | 45.92290 | 51.95310 | 49.56050 | 45.99610 |

Network % Usage:

| Server | Interval 1 | Interval 2 | Interval 3 | Interval 4 | Interval 5 |
|---|---|---|---|---|---|
| 1 | 0.01850560 | 0.01910880 | 0.01899450 | 0.02002740 | 0.01926080 |
| 2 | 0.00788531 | 0.00912572 | 0.00808553 | 0.00826528 | 0.01501720 |
| 3 | 0.02513630 | 0.02619960 | 0.02841930 | 0.02543450 | 0.02428200 |
| ... | | | | | |
| 116 | 1.10485000 | 1.08312000 | 1.11611000 | 1.07621000 | 1.20697000 |

Server Characterizations
CPU resource characterization over 6 days of data:

t(as.data.frame(apply(cpu-6d[,2:73],1,function(x){c(mean=mean(x),variance=var(x),quantile(x, probs=seq(0.5,0.9,0.1)))})))

| Server | Mean | Variance | 50% | 60% | 70% | 80% | 90% |
|---|---|---|---|---|---|---|---|
| 1 | 0.62500899 | 5.1936e−04 | 0.62500000 | 0.63151050 | 0.63802083 | 0.64380442 | 0.65461206 |
| 2 | 0.46233278 | 1.2761e−02 | 0.49367253 | 0.49953032 | 0.50294739 | 0.50668981 | 0.51450021 |
| 3 | 0.50805335 | 2.3603e−03 | 0.49560542 | 0.49961142 | 0.50406903 | 0.51074217 | 0.52035169 |
| ... | | | | | | | |

Memory resource characterization over 6 days of data:

t(as.data.frame(apply(mem-6d[,2:73],1,function(x){c(mn=mean(x),var=var(x),quantile(x,probs=seq(0.5,0.9,0.1)))})))

| Server | Mean | Variance | 50% | 60% | 70% | 80% | 90% |
|---|---|---|---|---|---|---|---|
| 1 | 42.716817 | 1.8098e−02 | 42.700200 | 42.724600 | 42.766080 | 42.822300 | 42.868660 |
| 2 | 9.625696 | 5.4205e−02 | 9.566240 | 9.781900 | 9.855140 | 9.871420 | 9.886886 |
| 3 | 9.858082 | 5.1099e−03 | 9.855140 | 9.863280 | 9.879560 | 9.886072 | 9.918622 |
| ... | | | | | | | |

Network resource characterization over 6 days of data:

$t$(as.data.frame(apply(nw456[,2:73],1,function($x$){$c$(mn=mean($x$),var=var($x$),quantile($x$,probs=seq(0.5,0.9,0.1)))})))

| Server | Mean | Variance | 50% | 60% | 70% | 80% | 90% |
|---|---|---|---|---|---|---|---|
| 1 | 0.02001460 | 1.4718e−05 | 0.01901960 | 0.01948642 | 0.02027047 | 0.02196808 | 0.02615052 |
| 2 | 0.00960358 | 1.6361e−05 | 0.00840083 | 0.00848364 | 0.00875359 | 0.00913694 | 0.01115456 |
| 3 | 0.02734709 | 8.3621e−06 | 0.02724505 | 0.02800490 | 0.03018421 | 0.03053106 | 0.03090690 |
| ... | | | | | | | |

Cluster Characterization

>data<−$k$means($t$(as.data.frame(apply(cpu-nw-mem-6$d$,1,function($x$) {$c$(mn=mean($x$),sd=sd($x$),quantile($x$,probs=seq(0.5,0.9,0.1)))}))),4)

K-means clustering with 4 clusters of sizes 12, 11, 5, 88

| Cluster | Mean | S. Dev. | 50% | 60% | 70% | 80% | 90% |
|---|---|---|---|---|---|---|---|
| 1 | 8.8845816 | 4.56441922 | 7.46854211 | 9.35963650 | 11.3038809 | 12.3704410 | 14.3996093 |
| 2 | 12.3704410 | 13.98647443 | 11.64001147 | 16.7133108 | 22.8126592 | 27.4440515 | 34.3350360 |
| 3 | 49.9045676 | 12.94616471 | 45.80268192 | 55.1718474 | 61.0167136 | 63.3082442 | 67.4986161 |
| 4 | 1.02900238 | 0.61898268 | 0.84736741 | 0.94700104 | 1.0823712 | 1.3113681 | 1.58204582 |

Clustering Vector

| Server | Cluster |
|---|---|
| 1 | 4 |
| 2 | 4 |
| 3 | 4 |
| ... | |
| 116 | 2 |

While only partial data is shown in the tables above, data for all servers 105 in the network were used, and each server 105 was assigned to a cluster accordingly.

The sample data was also used to train a neural network model 218. The network characteristics of each server 105 are input into the neural network model 218, as well as the cluster 216 the server 105 belongs to (based on the output of the k-means cluster analysis).

Training the Neural Network print(net→neuralnet(data$cluster, nw-6d))

For example, Server 1 in cluster 4 has the following network characteristics, which are input into the training model:

>(apply(nw456[,2:73],1,function($x$){$c$(mn=mean($x$),sd=sd($x$),quantile($x$,probs=seq(0.5,0.9,0.1)))})

Mean: 0.02001460278
Standard Deviation: 0.00383642858
50%: 0.01901960000
60%: 0.01948642000
70%: 0.02027047000
80%: 0.02196808000
90%: 0.02615052000

When a new server (Server 117 below) is added to the network 100, the network usage characteristics are used with a "predict" function of the neural network model 218 to identify the cluster 216 to which the new server belongs.

Server 117 network characteristics:
Mean: 0.019538861111
Standard Deviation: 0.004003781315
50%: 0.018882550000
60%: 0.019623540000
70%: 0.019911950000
80%: 0.020888040000
90%: 0.021997080000

From the "predict" function in the neural network model, the new server (Server 117) is predicted to be part of cluster 4, so the CPU and memory statistics of cluster 4 are assigned to the new server.

An embodiment of server management in a network 100 includes at least one processor coupled directly or indirectly to memory elements through a system bus such as a data, address, and/or control bus. The memory elements can include local memory employed during actual execution of the program code, bulk storage, and cache memories which provide temporary storage of at least some program code in order to reduce the number of times code must be retrieved from bulk storage during execution.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, including the operations for server management in a network described herein.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Embodiments of the invention can take the form of an entirely hardware embodiment, an entirely software embodiment, or an embodiment containing both hardware and software elements. In one embodiment, the invention is implemented in software, which includes but is not limited to firmware, resident software, microcode, etc.

Furthermore, embodiments of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include a compact disk with read only memory (CD-ROM), a compact disk with read/write (CD-R/W), and a digital video disk (DVD).

Input/output or I/O devices (including but not limited to keyboards, displays, pointing devices, etc.) can be coupled to the system either directly or through intervening I/O controllers. Additionally, network adapters also may be coupled to the system to enable the data processing system to become coupled to other data processing systems or remote printers or storage devices through intervening private or public networks. Modems, cable modems, and Ethernet cards are just a few of the currently available types of network adapters.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A computer program product for a network management device, comprising:
a non-transitory computer readable storage medium to store a computer readable program, wherein the computer readable program, when executed on a computer, causes the computer to perform operations for server management in a computer network, the operations comprising:
grouping a plurality of servers in a network into a plurality of clusters;
receiving network usage data for a new server added to the network, the network usage data generated at a network communication device external to the new server, wherein the network communication device is a router;
classifying the new server into a cluster from the plurality of clusters based only on the network usage data received for the new server prior to classifying the new server and on a cluster characterization characterizing resource usage data for the servers in the cluster, without receiving processor usage data for the new server, and without receiving memory usage data for the new server;
predicting processor usage and memory usage for the new server based only on the network usage data for the new server and on the cluster characterization; and
allocating one or more workloads from a plurality of workloads to the new server based on the cluster characterization.

2. The computer program product of claim 1, wherein the computer program product, when executed on the computer, causes the computer to perform additional operations, comprising:
updating the cluster characterization for the cluster with the network usage data of the new server after the new server is classified.

3. The computer program product of claim 1, wherein classifying the new server into the cluster further comprises:
training a neural network model to correctly identify clusters based on network usage data for all of the servers in each cluster; and
using the neural network model to correctly classify the new server into the cluster and to predict the processor usage and memory usage for the new server.

4. The computer program product of claim 1, wherein the computer program product, when executed on the computer, causes the computer to perform additional operations, comprising:
calculating a server characterization of the network usage data for the new server for comparing to the cluster characterization when classifying the new server.

5. The computer program product of claim 4, wherein the server characterization comprises at least one value of the group consisting of mean, variance, $50^{th}$ percentile, $60^{th}$ percentile, $70^{th}$ percentile, $80^{th}$ percentile, and $90^{th}$ percentile.

6. The computer program product of claim 1, wherein the computer program product, when executed on the computer, causes the computer to perform additional operations, comprising: calculating upper and lower fence values for the resource usage data; and eliminating outlier values from the resource usage data that fall above the upper fence value or below the lower fence value.

7. The computer program product of claim 1, wherein the computer program product, when executed on the computer, causes the computer to perform additional operations, comprising:
prior to grouping the plurality of servers into the plurality of clusters, receiving resource usage data for a plurality of servers, wherein resource usage data for a server comprises one or more of processor usage data, memory usage data, and network usage data for the server, wherein grouping the plurality of servers into the plurality of clusters is based on the resource usage data, such that a cluster characterization for a first cluster characterizes resource usage data for servers in the first cluster.

8. A method for server consolidation in a computer network, comprising:

grouping a plurality of servers in a network into a plurality of clusters;

receiving network usage data for a new server added to the network, the network usage data generated at a network communication device external to the new server, wherein the network communication device is a router;

classifying the new server into a cluster from the plurality of clusters, based only on the network usage data received for the new server prior to classifying the new server and on a cluster characterization characterizing resource usage data for the servers in the cluster, without receiving processor usage data for the new server, and without receiving memory usage data for the new server;

predicting processor usage and memory usage for the new server based only on the network usage data for the new server and on the cluster characterization; and allocating one or more workloads from a plurality of workloads to the new server based on the cluster characterization.

9. The method of claim 8, wherein the method further comprises:

updating the cluster characterization for the cluster with the network usage data of the new server after the new server is classified.

10. The method of claim 8, wherein classifying the new server into the cluster further comprises:

training a neural network model to correctly identify clusters based on network usage data for all of the servers in each cluster; and using the neural network model to correctly classify the new server into the cluster and to predict the processor usage and memory usage for the new server.

11. The method of claim 8, wherein the method further comprises:

calculating a server characterization of the network usage data for the new server for comparing to the cluster characterization when classifying the new server.

12. The method of claim 11, wherein the server characterization comprises at least one value of the group consisting of mean, variance, $50^{th}$ percentile, $60^{th}$ percentile, $70^{th}$ percentile, $80^{th}$ percentile, and $90^{th}$ percentile.

13. A network management device, comprising:

a processing device configured to:

group a plurality of servers in a network into a plurality of clusters;

receive network usage data for a new server added to the network, the network usage data generated at a network communication device external to the new server, wherein the network communication device is a router;

classify the new server into a cluster from the plurality of clusters, based only on the network usage data received for the new server prior to classifying the new server and on a cluster characterization characterizing resource usage data for the servers in the cluster, without receiving processor usage data for the new server, and without receiving memory usage data for the new server;

predict processor usage and memory usage of the new server based only on the network usage data for the new server and on the cluster characterization; and allocating one or more workloads from a plurality of workloads to the new server based on the cluster characterization.

14. The device of claim 13, wherein the processing device is further configured to update the cluster characterization for the cluster with the network usage data of the new server after the new server is classified.

15. The device of claim 13, wherein classifying the new server into the cluster further comprises:

training a neural network model to correctly identify clusters based on network usage data for all of the servers in each cluster; and using the neural network model to correctly classify the new server into the cluster and to predict the processor usage and memory usage for the new server.

16. The device of claim 13, wherein the processing device is further configured to:

calculate a server characterization of the network usage data for the new server for comparing to the cluster characterization when classifying the new server.

17. The device of claim 16, wherein the server characterization comprises at least one value of the group consisting of mean, variance, $50^{th}$ percentile, $60^{th}$ percentile, $70^{th}$ percentile, $80^{th}$ percentile, and $90^{th}$ percentile.

18. A network management system, comprising:

a network management device of a network having a processing device; and a network communication device in communication with the network management device, wherein the processing device is configured to:

group the plurality of servers of the network into a plurality of clusters;

receive network usage data for a new server added to the network from the network communication device, the network usage data generated by the network communication device, the network communication device external to the new server, wherein the network communication device is a router;

classify the new server into a cluster from the plurality of clusters based only on the network usage data received for the new server prior to classifying the new server and the cluster characterization characterizing resource usage data for the servers in the cluster without receiving processor usage data for the new server, and without receiving memory usage data for the new server;

predicting processor usage and memory usage for the new server based only on the network usage data for the new server and on the cluster characterization; and allocate one or more workloads from a plurality of workloads to the new server based on the cluster characterization.

19. The network management system of claim 18, wherein the processing device is further configured to:

prior to grouping the plurality of servers into the plurality of clusters, receive resource usage data for a plurality of servers, wherein resource usage data for a server comprises one or more of processor usage data, memory usage data, and network usage data for the server, wherein grouping the plurality of servers into the plurality of clusters is based on the resource usage data, such that a cluster characterization for a first cluster characterizes resource usage data for servers in the first cluster.

\* \* \* \* \*